(12) United States Patent
Pezzaniti (10) Patent No.: US 6,974,216 B2
(45) Date of Patent: Dec. 13, 2005

(54) AUTOSTEREOSCOPIC 3-D DISPLAY

(75) Inventor: Joseph Larry Pezzaniti, Harvest, AL (US)

(73) Assignee: Mems Optical, Inc., Huntsville, AL (US)

( * ) Notice: Subject to any disclaimer, the term of this patent is extended or adjusted under 35 U.S.C. 154(b) by 0 days.

(21) Appl. No.: 10/766,240

(22) Filed: Jan. 29, 2004

(65) Prior Publication Data

US 2005/0024590 A1 Feb. 3, 2005

Related U.S. Application Data

(60) Provisional application No. 60/443,184, filed on Jan. 29, 2003.

(51) Int. Cl.[7] .................. G03B 21/14; G02B 27/22
(52) U.S. Cl. .................. 353/7; 359/619; 359/462
(58) Field of Search .................. 353/7, 10, 38; 359/458, 462, 463, 464, 466, 478, 619; 348/759, 348/756, 750

(56) References Cited

U.S. PATENT DOCUMENTS

| | | | |
|---|---|---|---|
| 5,005,968 A | * | 4/1991 | Tejima et al. ............... 353/122 |
| 5,250,967 A | * | 10/1993 | Miyashita .................... 353/38 |
| 5,971,546 A | * | 10/1999 | Park ........................... 353/38 |
| 6,064,424 A | | 5/2000 | Berkel et al. |
| 6,118,584 A | * | 9/2000 | Van Berkel et al. ........ 359/463 |
| 6,445,406 B1 | | 9/2002 | Taniguchi et al. |
| 6,825,985 B2 | * | 11/2004 | Brown et al. ............... 359/619 |
| 2003/0001644 A1 | | 1/2003 | Brown et al. |

* cited by examiner

*Primary Examiner*—William C. Dowling
(74) *Attorney, Agent, or Firm*—Olds, Maier & Richardson, PLLC (57) ABSTRACT

A lenslet array having lenslets where the lenslets are variously shaped, and/or rotated and/or tilted, reducing gap images in an image formed by pixels/subpixels, where the pixel/subpixels have gaps between each other forming the gap images.

20 Claims, 7 Drawing Sheets

FIGURE 5 B
Section A-A

AUTOSTEREOSCOPIC 3-D DISPLAY

CROSS-REFERENCE TO RELATED APPLICATIONS

This application is a conversion of U.S. Provisional Patent Application No. 60/443,184 filed on 29 Jan. 2003, "AUTOSTEREOSCOPIC (3-D) DISPLAY USING LENSES TO MINIMIZE GAP IMAGES", by Joseph Larry Pezzaniti, the contents of which are incorporated in their entirety by reference.

FIELD OF THE INVENTION

The present invention relates to autostereoscopic 3-D display devices and methods.

BACKGROUND OF THE INVENTION

A three-dimensional display of images can be created by a stereoscopic display. A stereoscopic display provides multidimensional image cues to a viewer by combining two alternative two-dimensional views of the same object or scene. Each view is observed by one of the viewer's eyes and the two views are subsequently integrated by the human visual system to form a three-dimensional image perceived by the viewer. An autostereoscopic display is a form of stereoscopic display that requires no head-mounted equipment (e.g. red-green glasses).

Related art autostereoscopic displays can use lenses positioned in alignment with display picture elements, such that interlaced left and right eye images are directed at fixed angles, which do not necessarily represent a viewer's actual left and right eye viewing zones. Because the lenses are aligned with pixels, interference pattern noise or moiré patterns result from spatial mismatches between pixel edges and cylindrical lens edges when viewed off-axis. In addition the alignment results in projection of images outside the viewer's proper left and right eye viewing zones.

Related art methods of solving some of these problems with color pixels results in the display being rotated ninety degrees. Color displays are normally constructed with pixels each comprising a plurality of color elements (e.g. red, green, blue) arranged alongside each other along a generally horizontal line of the display as oriented in its position of intended use. Related art displays have the red, blue and green pixels vertically aligned. Related art methods result in the display arranging the color pixels in a vertical manner (display rotated ninety degrees). Such methods require modifications to the driving convention of the display and limit the ability to convert related art displays to provide stereoscopic images. Additionally color pixels and subpixels have gaps resulting in gaps in the image. Thus, when a viewer moves his/her head the gaps are viewed as black lines.

SUMMARY OF THE INVENTION

Exemplary embodiments of the invention provide devices and methods for autostereoscopic display, which can use related art pixel arrays.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limited the scope of the invention.

BRIEF DESCRIPTION OF THE DRAWINGS

Embodiments of present invention will become more fully understood from the detailed description and the accompanying drawings, wherein.

DETAILED DESCRIPTION OF EXEMPLARY EMBODIMENTS OF THE INVENTION

The following description of exemplary embodiment(s) is merely illustrative in nature and is in no way intended to limit the invention, its application, or uses.

Figure 1:
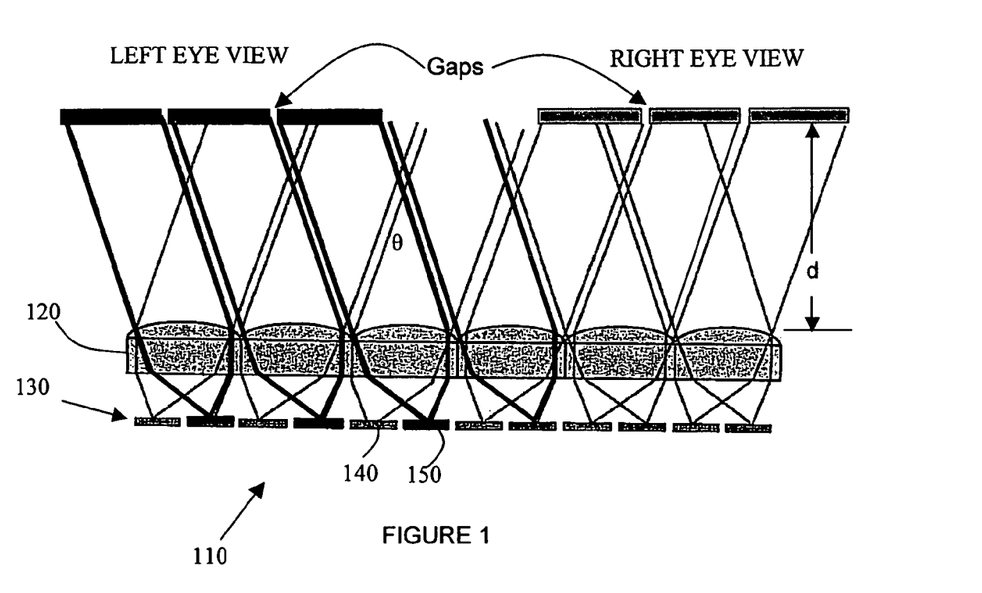
FIG. 1 illustrates using micro-lens to interlace images into right and left views in accordance with at least one exemplary embodiment.
Figure 1A:
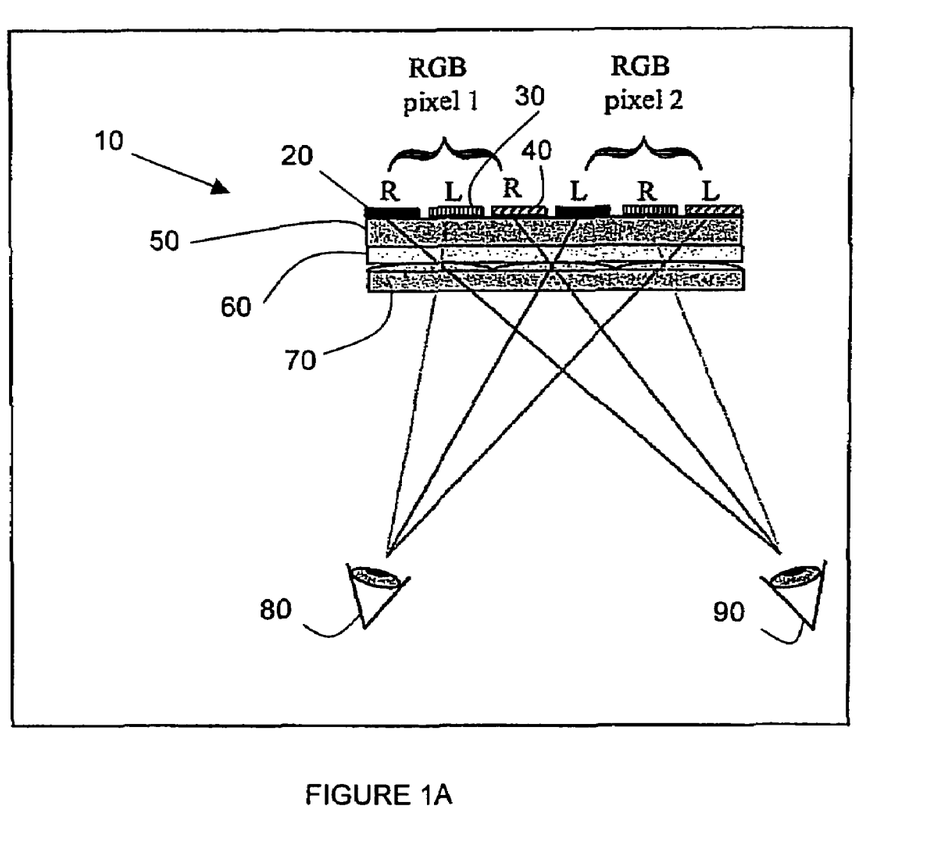
FIG. 1A illustrates a basic design for a 3D display in accordance with at least one exemplary embodiment.

FIG. 1A illustrates an autostereoscopic display 10 in accordance with at least one exemplary embodiment. A single row of pixels is shown, pixel 1 and pixel 2. Each pixel is composed of subpixels 20, 30, and 40. For example subpixel 20 can be a red subpixel, subpixel 30 a green subpixel, and subpixel 40 a blue subpixel. Other combinations and numbers of subpixels can compose a pixel and the discussion herein should not be interpreted to limit the number of subpixels in a pixel to three nor the colors to only red, green, and blue. A combination of subpixels in either pixel 1 and pixel 2 combine to form a right eye view 90 and a left eye view 80. The subpixels corresponding to the right view are designated "R" and for the left view "L." In the exemplary embodiment shown, the right eye view 90 receives light from red subpixel 20 and blue subpixel 40 in pixel 1 and a green subpixel from pixel 2. Likewise the left eye view 80 receives light from green subpixel 30 from pixel 1 and from red and blue subpixels from pixel 2. The left eye view 80 and the right eye views 90 are formed by light from the subpixels interlaced by cylindrical lenslets in a lenslet array 70. In the exemplary embodiment shown, a LCD cover glass 50 covers pixels 1 and 2, and is separated by the lenslet array 70 by a plastic layer 60. In other embodiments various types of materials can be used and the plastic layer need not be used. For example, the lenslets can be of various sizes and made of various materials such as glass, silicon, and other like material.

The light from the subpixels is collimated by the lenslets. The light being generated by the subpixels or via illumination of the subpixels. The light impinges on pupils of eyes at the left eye view 80 position and the right eye view 90 position, creating left and right stereo images. A viewing system, for example an imaging device (e.g. camera, optical detector, computer interface, and the like) or biological entity (e.g. person, human, animal, and the like) can be placed to intercept the images at the left eye view 80 and the right eye view 90.

The lenslet array 70 can be linearly arranged, as shown, or arranged in a curved fashion and can depend on the use. The lenslets can be cylindrical lenses or of various shapes depending upon the intended viewing positions and the arrangement of the lenslet array 70. The color subpixels can be spread in the same direction of the separation of the left and right views.

The pixels 1 and 2, are grouped with other pixels to form a pixel array. The pixel array can form a 2-D image. The lenslet array 70 placed between the pixel array and the left and right eye views 80 and 90 can create a 2-D image. The lenslet arrays can also enable the formation of a 3-D image. Thus, the at least one exemplary embodiment shown in FIG. 1A can display both 2-D and 3-D images. Thus, in accordance with at least one exemplary embodiment, a 3-D display is realized with a flat-screen color display and a lenslet array.

Figure 2:
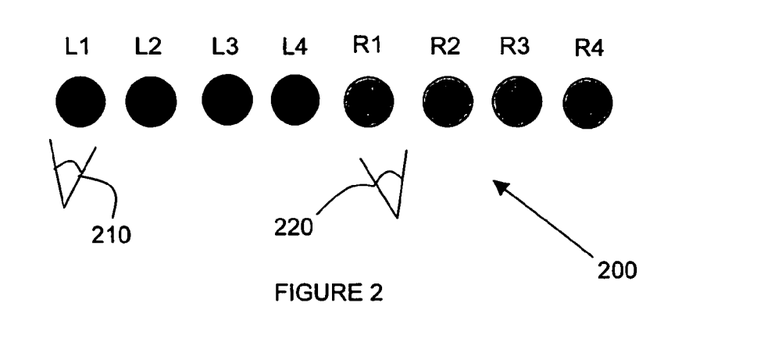
FIG. 2 illustrates eight (8) interlaced views, four right eye views and four left eye views in accordance with at least one exemplary embodiment.

FIG. 1 illustrates a simple two view, left eye view and right eye view, resulting from a display 110 having light emitted from right eye view pixels 140 and left eye view pixels 150 on pixel array 130. The light passing through a lenslet array 120 forms the left eye view and the right eye view. The left eye view and right eye views are separated from each other by an imaginary dividing line. If a viewing system is positioned such that a left eye detector is positioned to the left of the imaginary line and a right eye detector of the viewing system is positioned to the right of the imaginary line, the left eye detector will see the left eye view and the right eye detector will see the right eye view. The arrangement can be repeated creating multiple views such as those shown in FIG. 2. The views can be spaced such that when a viewing system moves in a left or right direction the viewing system passes through the multiple views. FIG. 2 illustrates eight interlaced views L1–L4 and R1–R4. For example, if the viewing system is a head, when the head is moved either left or right the eyes see the multiple views. For example a left eye 210 can see view L1, while a right eye 220 can see view R1, moving the head changes the view (L2) seen by the left eye 210 and the view (R2) seen by the right eye 220. The gaps, as shown in FIG. 1, shows up as black lines as a viewing system is moved left or right.

The distance between views can vary depending upon design, (e.g. example 1–200 mm or the like). The distance between views can be a function of the angular separation between the left eye view and the right eye view, θ, and the distance "d" the viewing system is from the display. The angular separation θ can be a function of an angular magnification of the lenslet in the lenslet array 120 and the pixel pitch of the display 110.

Figure 3:
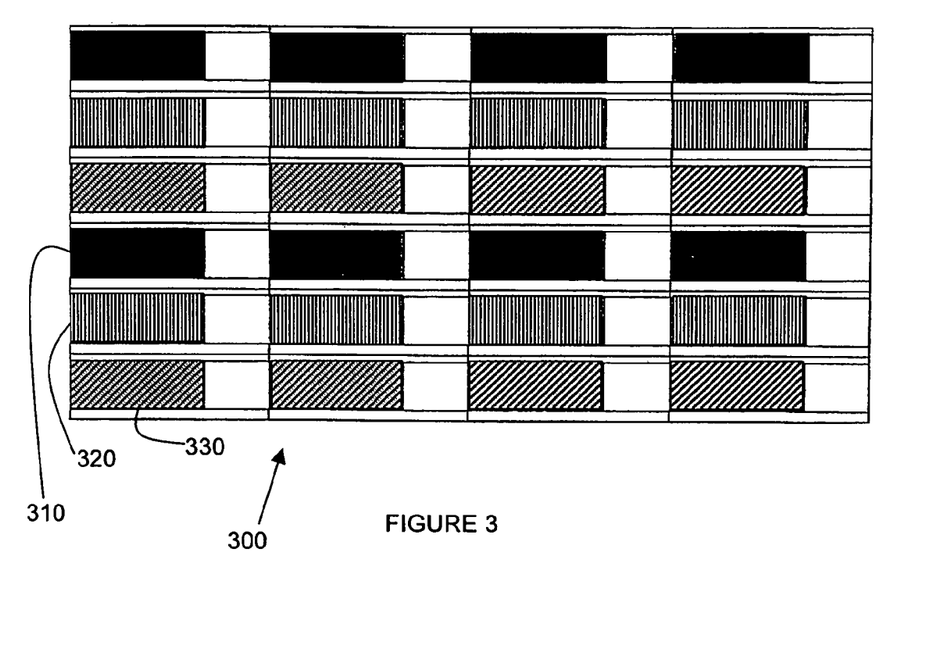
FIG. 3 illustrates an exemplary arrangement of the three color pixels (in gray scale) in accordance with the arrangement in accordance with at least one exemplary embodiment.

The pixel array 130 can have a variety of pixel and subpixel arrangements. FIG. 3 illustrates a pixel arrangement in a pixel array 300 in accordance with at least one exemplary embodiment. A single pixel is composed of three subpixels 310, 320, and 330. Although three subpixels are shown, any number of subpixels can be used, including one. The subpixels can vary in color, for example subpixel 310 can transmit red light, subpixel 320 can transmit green light, and subpixel 330 can transmit blue light. The pixel array 130 shows two rows and four columns of pixels. The subpixels transmit or generate light, however there are gaps between subpixels as shown in FIG. 1. The gaps in the vertical and horizontal dimensions can vary and result in gap images. For example, the gap space can be 30% of the horizontal dimensions of the subpixels, and the vertical gap space can be 10% of the vertical dimension of the subpixels. Although 30% and 10% are mentioned for gap space values in the horizontal and vertical dimensions respectively, pixel and subpixel arrangements can have a variety of gap space sizes and proportions in various exemplary embodiments.

Varying the shape of the lenslets can decrease the effect of the gaps on viewing. In at least one exemplary embodiment, the shape of the lenslets are designed and manufactured to decrease the effect of subpixel and pixel gap space, reducing the effect of gaps on viewing. For example, using gray scale etching techniques, the shape of the lenslets can be manufactured to blur the black lines. The black lines can be blurred to a degree where the black line images can be significantly reduced without resulting in image overlap. Although if image overlap is desired, such an arrangement can also be accomplished in exemplary embodiments.

Figure 4:
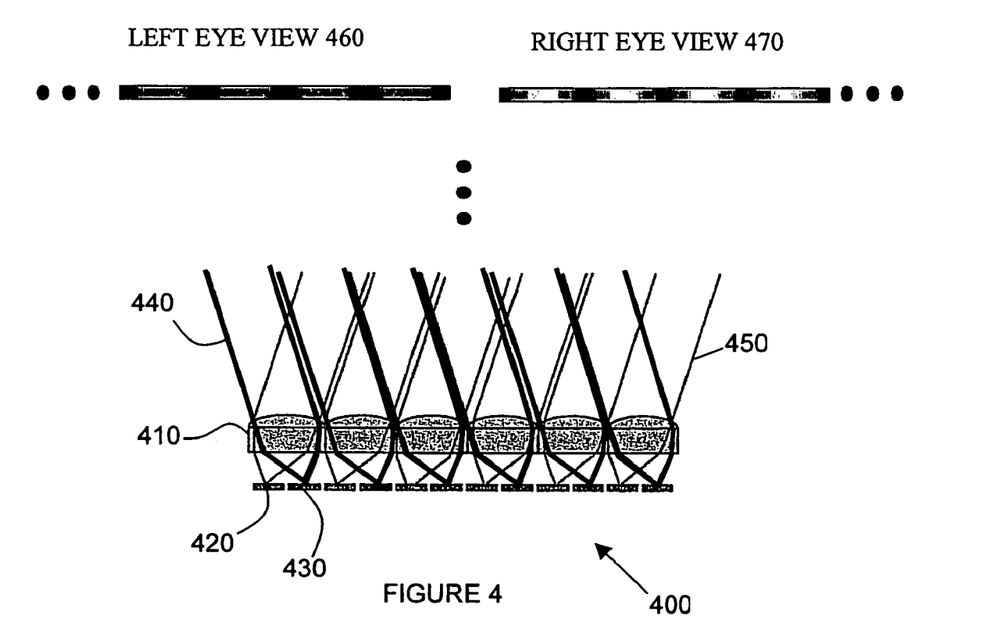
FIG. 4 illustrates methods of reducing the influence of the gap images shown in FIG. 1 in accordance with at least one exemplary embodiment.

FIG. 4 illustrates a display 400 in accordance with at least one exemplary embodiment. The right view pixel 420 and left view pixel 430 emits light that is seen by the right eye view 470 and the left eye view 460 respectively. The lenslet array 410 contains lenslets with radii of curvature that have been manufactured to blur the gap images. The gap images are blurred such that when a viewing system moves left or right, along a plane of observation, the light from pixels are slightly overlapped. The amount of overlap can vary (e.g. 0–100% overlap). In at least one exemplary embodiment, the overlap does not exceed 30%.

In further exemplary embodiments the gap images can be blurred by effectively rotating or tilting lenslets in lenslet arrays. Rotating refers to rotating a lenslet in a plane of the lenslet array a rotation angle. Tilting refers to rotating the lenslet out of such a plane a tilting angle. The rotation angle and the tilting angle can vary in accordance to exemplary embodiments. For example, in at least one exemplary embodiment the rotation angle is between 5 and 55 degrees. The rotation angle and the tilting angle can vary depending upon the arrangement of pixels and subpixels and the gap spaces associated with the arrangements. A rotation angle greater than 0 degrees rotates an associated pixel image. The rotation of pixel images result in partial overlaps of pixel images blurring gap images. A tilting angle tilts an associated pixel image at an observation plane overlapping pixel images reducing gap images.

Figure 5:
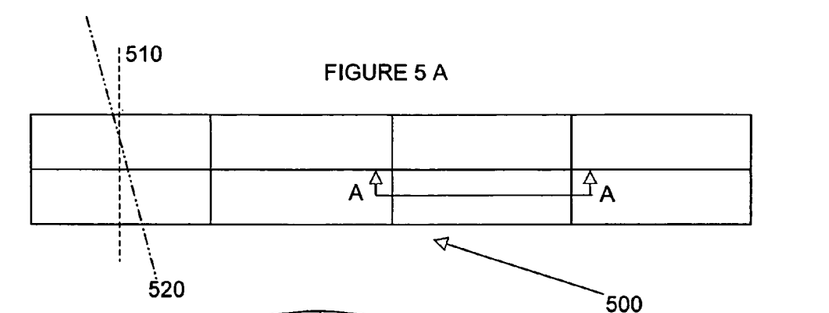
FIG. 5A illustrates lenslets in accordance with at least one exemplary embodiment.
FIG. 5B illustrates a cross section of section A—A of FIG. 5A.

A lenslet array 500 in accordance with at least one exemplary embodiment is shown in FIG. 5A, where a first axis 520 is parallel to a line corresponding to a center of curvature of a face of the lenslet 530, and the second axis 510 bisects a projection of the lenslet. A first vector and a second vector corresponding to the first axis 520 and second axis 510 respectively intersect at an intersect angle. The intersect angle can have a projection corresponding to the rotation angle and another projection corresponding to the tilting angle. FIG. 5B shows the lenslet 530 corresponding to the cross section A—A of FIG. 5A. The cross section shows a lenslet having a radius of curvature 540, which can be varied to blur gaps images. The lenslet can be rotated with respect to a plane in the lenslet array 500 with a radius of curvature 540 chosen so that the rotation rotates pixel images to overlap and the radius of curvature blurs pixel images resulting in blurred gap images. Although both methods can be used concurrently to blur gap images, either can be used independently or in different degrees with the other method. In addition, the method of tilting can be employed independently or in combination with the other two methods.

Those skilled in the art will appreciate that the lenslets can be manufactured in numerous ways, for example the lenslets can be manufactured by gray scale etching, molding, pressing, wet etching, DRIE etching, reflow, milling and polishing, or any other type of lens manufacturing technique. The lenslet size can vary (e.g. 1 nm->100 mm, or larger or smaller depending upon the pixel sizes), covering at least one pixel, or portions of pixels. The lenslets can be oriented with respect to associated pixels with the various first and second axis not aligned. For example if the lenslets of FIG. 5A are aligned with underlying associated pixels the second axis could be aligned, while the first axis not is aligned with underlying associated pixels.

Figure 6:
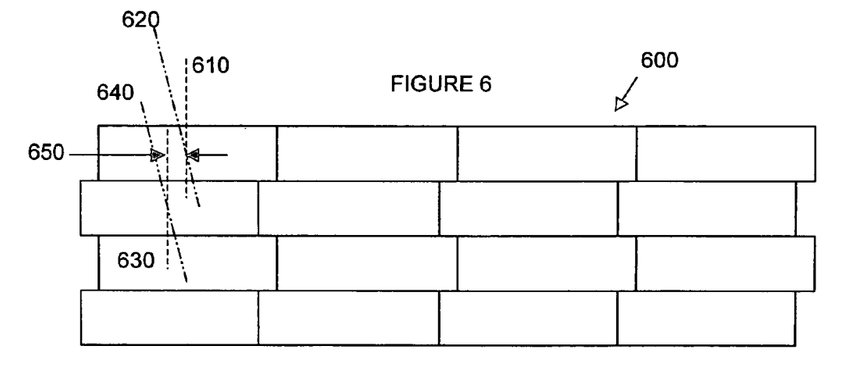
FIG. 6 illustrates lenslets in accordance with at least one exemplary embodiment.

FIG. 6 illustrates a lenslet array 600 in accordance with at least one exemplary embodiment. The lenslet array 600 contains lenslets, a first lenslet having a first lenslet first axis 620 and a first lenslet second axis 610, and a second lenslet having a second lenslet first axis 640 and a second lenslet second axis 630. Exemplary embodiments can have first lenslet first axis 620 not parallel to the second lenslet first axis 640, and can have the first lenslet second axis 610 not parallel to second lenslet second axis 630. The axes 620 and 640 can also be parallel but offset a distance. Likewise the axes 610 and 630 can be parallel but offset a distance 650. In various exemplary embodiments axes 610 and 630 can be parallel and coincident. The lenslet array 600 (FIG. 6) shows staggered lenslet rows offset a row offset distance. The row offset distance can be varied depending upon the angular separation of left and right views. For example, if the pixel pitch is 90 microns the row offset distance can be 45 microns to get a uniform spacing between the left and right view interlaced in the vertical direction.

Figure 7:
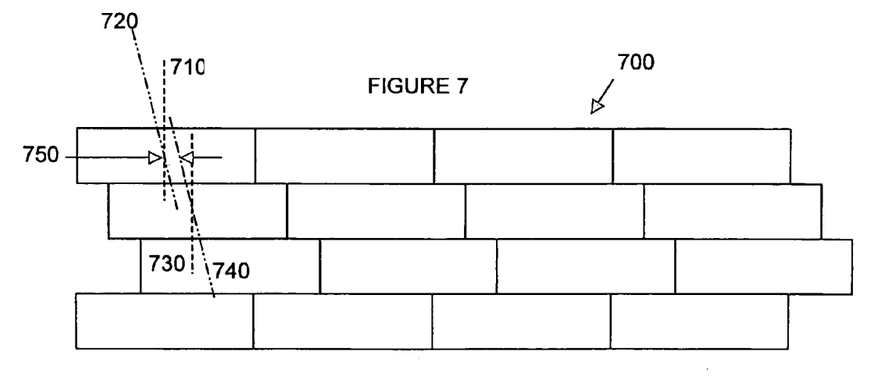
FIG. 7 illustrates lenslets in accordance with at least one exemplary embodiment.

FIG. 7 illustrates a lenslet array 700 in accordance with at least one exemplary embodiment. The lenslet array 700 contains lenslets, a first lenslet having a first lenslet first axis 720 and a first lenslet second axis 710, and a second lenslet having a second lenslet first axis 740 and a second lenslet second axis 730. Exemplary embodiments can have first lenslet first axis 720 not parallel to the second lenslet first axis 740, and can have the first lenslet second axis 710 not parallel to second lenslet second axis 730. The axes 720 and 740 can also be parallel but offset a distance. Likewise the axes 710 and 730 can be parallel but offset a distance 750. In various exemplary embodiments axes 710 and 730 can be parallel and coincident. The lenslet array 700 (FIG. 7) shows a repeating lenslet row offset. The row offset can be associated with a row offset distance that, in at least one exemplary embodiment, is related to the distance 750. The lenslets can each be associated with underlying pixels, which themselves can be offset compared to other vertical and horizontal pixels.

Figure 8:
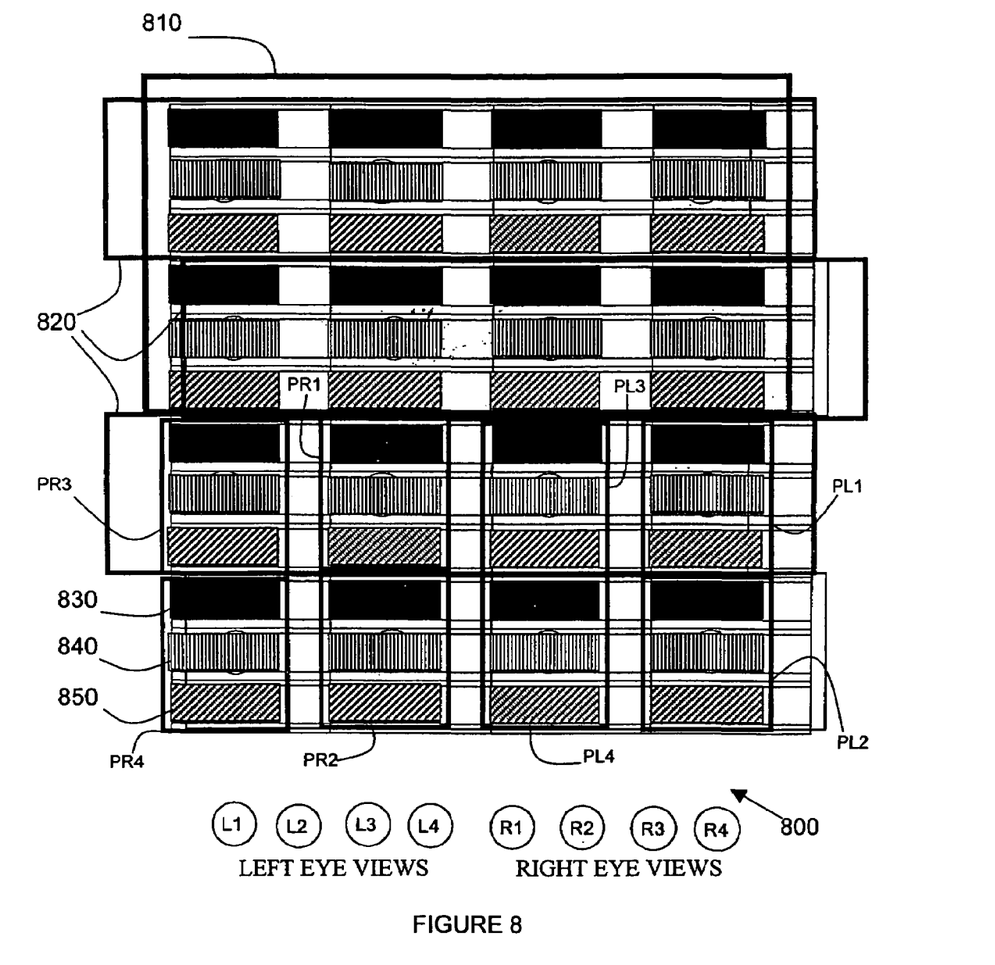
FIG. 8 illustrates a layout of pixels forming an eight (8) view 3D-autostereoscopic display in accordance with at least one exemplary embodiment.
Figure 9:
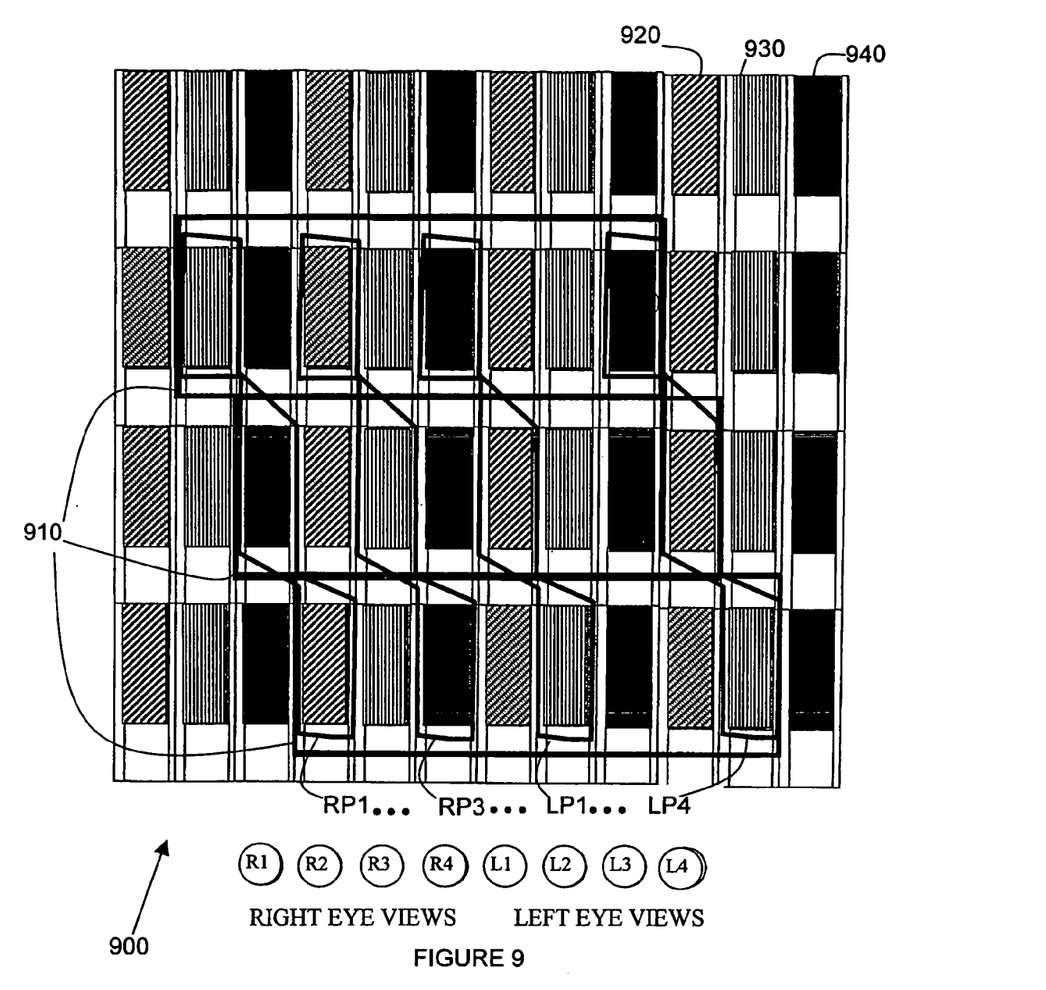
FIG. 9 illustrates another layout of pixels forming an eight (8) view 3D-autostereoscopic display in accordance with at least one exemplary embodiment.

Several arrangements of lenslets can be constructed to correspond to various pixel and subpixel arrangements. FIG. 8 illustrates an arrangement of lenslets in accordance with at least one exemplary embodiment with associated pixels. The display 800 shows a pixel array having pixels PR1, PR2, PR3, PR4, PL1, PL2, PL3, and PL4, having subpixels 830, 840, and 850. The subpixels 830, 840, and 850 can be of various colors (e.g. red, green, blue, white, and the like). The lenslets 820, cover associated pixels. For example the third lenslet 820 from the top covers pixels PR3, PR1, PL3, and PL1. A group of pixels can form various views. For example pixel PR1 corresponds to a right eye view R1 and pixel PL1 corresponds to a left eye view L1. FIG. 8 illustrates left and right views are constructed, (R1, R2, R3, R4, L1, L2, L3, and L4). Various pixels correspond to each view. Two lenslets cover the pixels PR1, PR2, PR3, PR4, PL1, PL2, PL3, and PL4, corresponding to the eight (8) views shown (L1, L2, L3, L4, R1, R2, R3, and R4). An image is composed of many pixels and additional pixels covered by additional lenslets combine to form an overall 2-D image, with eight different views. The subpixels, 830, 840, and 850 are arranged vertically, however they can be arranged horizontally as well, and a pixel can be a shape other than a rectangle or square. For example FIG. 9 illustrates horizontally aligned subpixels 920, 930, and 940, with pixels RP1 . . . RP4 and LP1 . . . LP4, formed by choosing diagonal subpixels. The pixels RP1 . . . RP4 and LP1 . . . LP4 correspond to views R1 . . . R4 and L1 . . . L4 respectively.

The horizontal views in FIG. 8 are perpendicular to the subpixel arrangement. In some instances, rotating, tilting, and varying the radius of curvature can result in color spreading. FIG. 9 illustrates a lenslet arrangement to minimize the effect of color spreading by associating diagonal subpixels with pixels in accordance with at least one exemplary embodiment.

The details discussion above has discussed several exemplary embodiments. These embodiments should not be interpreted to limit the scope. Many substitutions and uses are envisioned and are intended to lie within the scope of the invention. For example the term lenslet array can refer to various arrangements of lens structures (e.g. cylindrical lenses, micro lenses, non-symmetric lenses, symmetric lenses, and the like). Likewise, various types of displays can utilize lenslet arrays in accordance with exemplary embodiments, such as projection screen devices (e.g. projection T.V.), electroluminescent (EL) displays, field emission displays (FED), vacuum fluorescent (VF) displays, liquid crystal (LC) displays, organic light emitting diode (OLED) displays, high temperature poly-silicon (HTPS) and low temperature poly-silicon (LTPS) displays, LED displays, and other like systems and methods described in copending application entitled "AN AUTOSTEREOSCOPIC DISPLAY AND METHOD OF DISPLAYING MULTIDIMENSIONAL IMAGES ESPECIALLY COLOR IMAGES" by Rodney L. Clark, Daniel M. Brown, and Peter Erbach, filed in the U.S. Patent and Trademark Office on Jan. 27, 2000 (application Ser. No. 09/492,315), the contents of which are incorporated in its entirety.

Likewise various data structures could be implemented to derive a display in accordance with at least one exemplary embodiment, such as the data structures described in previously filed application entitled "AUTOSTEREOSCOPIC DISPLAY DRIVE SYSTEM", by Rodney L. Clark, Daniel M. Brown, John Karpinsky, and Peter Erbach, filed in the U.S. Patent and Trademark Office on Jan. 26, 2000 (application Ser. No. 09/491,430), the contents of which are incorporated in its entirety.

The description of the invention is merely exemplary in nature and, thus, variations that do not depart from the gist of the invention are intended to be within the scope of the embodiments of the present invention. Such variations are not to be regarded as a departure from the spirit and scope of the present invention.

What is claimed is:

1. An autostereoscopic array, comprising:
a lenticular array, the lenticular array having a plurality of lenslets, wherein each lenslet has at least a first and a second axis, where the first axis is parallel to a line corresponding to a center of curvature of a face of the lenslet, and the second axis bisects a projection of the lenslet, where vectors corresponding to each axis intersect at a non-zero first angle, the lenslet having a radius of curvature, where the lenticular array, if positioned between a viewing system and a pixel array where the pixel array has pixels composed of subpixel elements with gaps, will blur an image of the gaps with images of the pixels by choosing a rotation angle corresponding to a projection of the first angle.

2. The autostereoscopic array of claim 1, where the radius of curvature is varied instead of choosing the rotation angle to blur an image of the gaps.

3. The autostereoscopic array of claim 1, where a tilt angle is chosen instead of the rotation angle to blur an image of the gaps, where the tilt angle is a rotation of a lenslet into or out of a reference surface of the lenslet array, where the reference surface is defined by at least one of the tangents to the first axis of the lenslets and the centers of the lenslets.

4. The autostereoscopic array of claim 3, where the reference surface is concave in shape.

5. The autostereoscopic array of claim 3, where the reference surface is a non-concave.

6. The autostereoscopic array of claim 1 having at least a first and second lenslet, wherein the first axis of the first lenslet and the first axis of the second lenslet are offset an offset distance.

7. The autostereoscopic array of claim 1 having at least a first and second lenslet, wherein a first vector corresponding to the first axis of the first lenslet and a second vector corresponding to the first axis of the second lenslet intersect at a second non-zero angle.

8. The autostereoscopic array of claim 1 having at least a first and second lenslet, wherein the second axis of the first lenslet and the second axis of the second lenslet are offset an offset distance.

9. The autostereoscopic array of claim 1 having at least a first and second lenslet, wherein a first vector corresponding to the second axis of the first lenslet and a second vector corresponding to the second axis of the second lenslet intersect at a second non-zero angle.

10. The autostereoscopic array of claim 1, wherein the first angle is variable.

11. The autostereoscopic array of claim 1, wherein the radius of curvature is variable.

12. The autostereoscopic array of claim 1, wherein the viewing system is at least one of a user, an optical detector, and a camera.

13. An autostereoscopic display, comprising:
a pixel array, where the pixel array having a plurality of pixels, where at least one pixel has subpixel elements having gaps, the pixels being arranged in N groups corresponding with N individual perspective views to be displayed, each of the pixels forming a part of an individual perspective image; and
a lenticular array, the lenticular array having at least one lenslet, each lenslet having at least a first and a second axis, where the first axis is parallel to a line corresponding to a center of curvature of a face of the lenslet, and the second axis bisects a projection of the lenslet, where vectors corresponding to each axis intersect at a non-zero first angle, the lenslet having a radius of curvature, where if the lenticular array is positioned between a viewing system and the pixel array, where choosing the first angle and radius of curvature blurs an image of the gaps with images of the pixels.

14. The autostereoscopic display of claim 13, where N is two.

15. The autostereoscopic display of claim 13, where at least one pixel has three subpixel elements.

16. The autostereoscopic display of claim 15, where the subpixel elements can be at least one of a red subpixel, a green subpixel, and a blue subpixel.

17. The autostereoscopic display of claim 11, where at least one pixel has a white subpixel.

18. The autostereoscopic display of claim 11, where the display is used in an electronic display.

19. A method of autostereoscopic displaying a 3-D image comprising:
placing a lenticular array before a pixel array, the pixel array transmitting light, where the pixel array has a plurality of pixels, where a pixel has subpixels, and where the subpixels have gaps;
generating N individual perspective views using N groups of pixels in the pixel array; and
passing the light from the pixel array through the lenticular array, where the individual perspective views combine to form a 3-D autostereoscopic image, the lenticular array having at least one lenslet, each lenslet having at least a first and a second axis, where the first axis is parallel to a line corresponding to a center of curvature of a face of the lenslet, and the second axis bisects a projection of the lenslet, where vectors corresponding to each axis intersect at a non-zero first angle, the lenslet having a radius of curvature, where the lenticular array, will blur an image of the gaps with images of the views by choosing the first angle and the radius of curvature.

20. The method claim 19, further comprising:
placing the lenticular array between the pixel array and a user.

* * * * *